United States Patent [19]

Holladay et al.

[11] 4,114,672

[45] Sep. 19, 1978

[54] TIRE CHANGING APPARATUS

[75] Inventors: Jimmie L. Holladay; Ray A. Scott, both of Nashville, Tenn.

[73] Assignee: The Coats Company, Inc., LaVergne, Tenn.

[21] Appl. No.: 795,015

[22] Filed: May 9, 1977

[51] Int. Cl.² ............................................. B60C 25/12
[52] U.S. Cl. ................................................. 157/1.24
[58] Field of Search ........................ 157/1.1, 1.24, 1.28

[56] References Cited

U.S. PATENT DOCUMENTS

| | | | |
|---|---|---|---|
| 2,818,108 | 12/1957 | Wells ................................ | 157/1.28 X |
| 3,255,800 | 6/1966 | Strang et al. ........................ | 157/1.24 |
| 3,827,475 | 8/1974 | Brosene, Jr. ......................... | 157/1.28 |
| 3,937,264 | 2/1976 | Mikovits et al. ...................... | 157/1.1 |

*Primary Examiner*—Al Lawrence Smith
*Assistant Examiner*—James G. Smith

*Attorney, Agent, or Firm*—Wegner, Stellman, McCord, Wiles & Wood

[57] ABSTRACT

An improved tire changing apparatus for changing so-called "difficult tires" and/or changing tires at a more rapid rate and/or use in facilities having low pressure or widely fluctuating air pressure sources. The apparatus includes a base having an upwardly extending frame mounted thereon, a tire receiving table mounted on the frame, an elongated rocker arm pivoted at a point intermediate its ends to the frame, upper and lower bead loosening assemblies associated with respective ends of the arm, a rotatable post mounted on the table top, a linkage interconnecting the arm and the post for rotating the post in response to pivotal movement of the arm, a first cylinder connected between the arm and the base for pivoting the arm in one direction and a booster cylinder connected between the arm and the base for pivoting the arm in the one direction in concert with the first cylinder. Also disclosed is a retraction mechanism for an air chuck.

7 Claims, 4 Drawing Figures

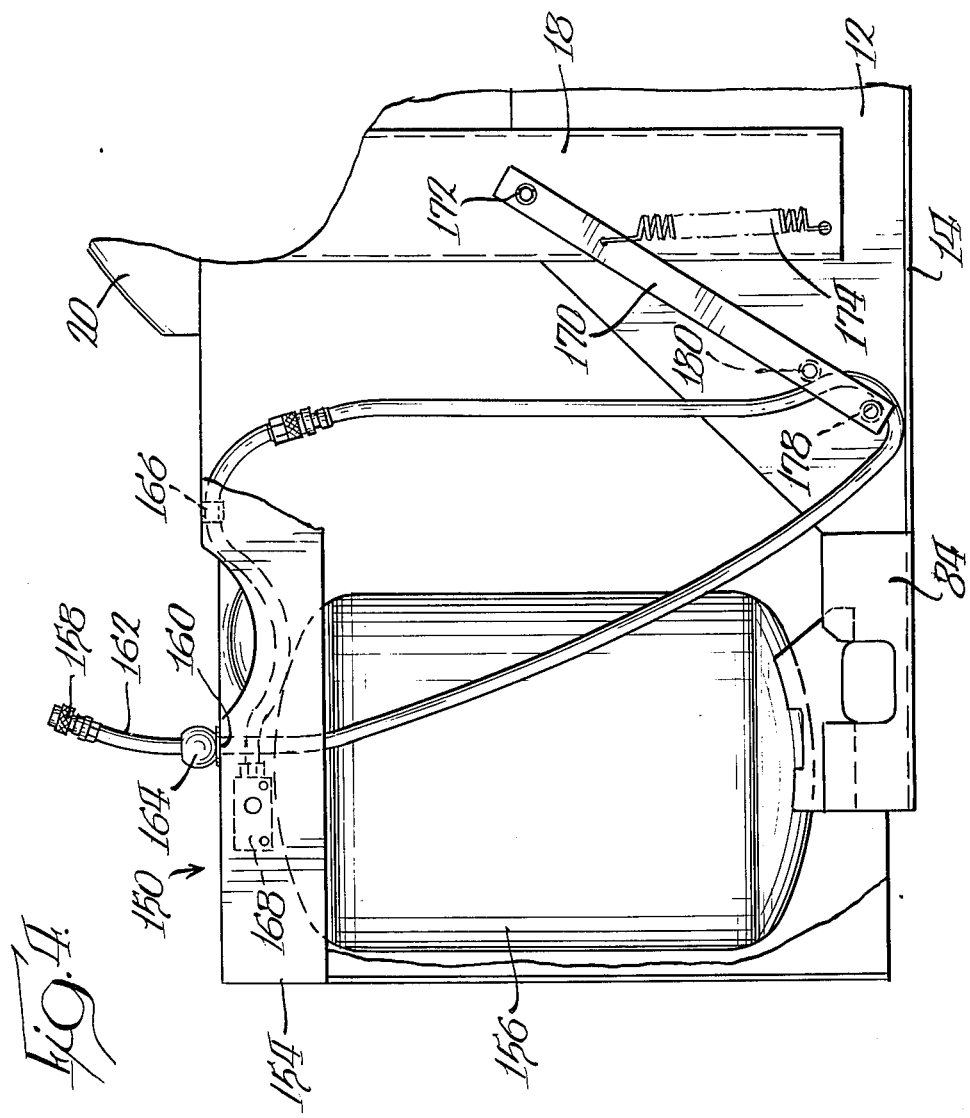

TIRE CHANGING APPARATUS

BACKGROUND OF THE INVENTION

This invention relates to tire changers and, more particularly, to powered tire changers utilizing a pressure fluid for power.

The most pertinent prior art known to the applicant is U.S. Pat. No. 3,255,800, issued June 14, 1966 to Strang et al.

A large number of tire changers embodying the principles disclosed in the above-identified Strang et al patent have been marketed domestically over the years and have been quite successful commercially. Such tire changers utilize an air cylinder for conjointly operating upper and lower bead loosener assemblies as well as a rotatable, tool-receiving center post used in mounting and demounting tires from a wheel. In the last few years, there has been a considerable increase in the number of massive auto servicing centers which, amongst other things, service tires. Not infrequently, such service centers have facilities whereby 15–20 or more automobiles may be simultaneously serviced.

As is well known, many of the tools utilized in servicing automobiles are pneumatically operated and, as a consequence, such centers typically are provided with large air compressor systems to provide a sufficient volume of compressed air at some desired operating pressure to operate the tools employed thereat. In the usual case, the system cannot provide the desired volume of air at the desired pressure when a large number of tools are simultaneously being operated. As a consequence, tire changing operations performed on tire changing stands of the type referred to are slowed due to the reduced air pressure available to the tire changer thereby decreasing efficiency of the operation.

Concurrently, domestic manufacturers of tires, especially high quality belted, radial tires, have been manufacturing their tires with sidewalls having increased stiffness. The placement or removal of such tires on wheels requires additional power over that required in the changing of more conventional tires due to the increased sidewall stiffness and this, in turn, has required even higher pressures at the air supply to ensure that the apparatus can change such tires efficiently.

Moreover, many small tire servicing centers have air supplies providing air at relatively low pressure, which pressure may be sufficiently low as to cause slow operation of the tire changer and, in some cases, preclude the changer from mounting or demounting tires having particularly stiff sidewalls.

In using such apparatus, after a tire has been serviced and replaced on a wheel, or a new tire placed on a wheel, it is necessary that the beads be seated and the tire inflated. Thus, air lines provided with air chucks have been located in proximity to the tire changer and in many commercially available tire changers, the air lines bearing the air chucks have been piped through part of the tire changer.

In either case, long lengths of flexible air hose will be in the vicinity of the tire changer and may impede efficient use of the machine in other of its operations not related to tire inflation.

SUMMARY OF THE INVENTION

The present invention is directed to overcoming one or more of the above problems.

According to one facet of the present invention, there is provided a tire changing apparatus including a base mounting an upwardly extending frame structure. A tire-receiving table is mounted on the frame structure and an elongated rocker arm is pivoted at a point intermediate its ends to the frame with its opposite ends extending to opposite sides of the table. Upper and lower bead loosener assemblies are associated with respective ends of the arm and a rotatable post is mounted on the table top. Means are provided for interconnecting the arm and the post for rotating the post in response to pivotal movement of the arm. A first cylinder is connected between the arm and the apparatus for pivoting the arm in at least one direction and a second, booster cylinder is connected between the arm and the apparatus for pivoting the arm in the one direction in concert with the first cylinder. The two cylinders increase the speed of operation of the tire changer and/or provide increased power for changing tires having stiff sidewalls and/or enable satisfactory use of the apparatus on air supplies operating at lower pressures than those heretofore used.

A highly preferred embodiment of the invention includes a pressure fluid supply conduit connected to the cylinders and a valve means for interrupting the supply conduit to the booster cylinder independently of the first cylinder and for venting the second cylinder so that the second cylinder may be selectively, effectively disconnected from the arm.

In a highly preferred embodiment, the second cylinder has a lesser stroke than the first cylinder and is connected to the rocker arm between the first cylinder and the point intermediate the arm ends whereat the arm is pivoted to the frame.

The invention contemplates that the frame structure include spaced legs and that the rocker arm comprise two spaced apart, generally parallel rails disposed between the legs of the frame structure. A web interconnects the rails adjacent one end thereof with the first cylinder being pivoted to the web. A channel interconnects the rails at a location between the web and the point of the pivotal connection to the frame. The booster cylinder is pivoted to the channel.

According to another facet of the invention, there is provided a tire changing apparatus including a base, a tire receiving table mounted on the base, and bead loosener means mounted on the base for movement relative to the table for loosening the beads on a tire and wheel received on the table. Means are disposed on the base for driving the bead loosening means and a housing is secured to the base and contains the driving means and partially contains the bead loosening means. The apparatus is provided with an air chuck having a flexible air hose connected thereto. An aperture is located in the housing and the air hose extends through the aperture into the housing with the air chuck located exteriorly of the housing. A stop is disposed on either the chuck or the air hose near the chuck for preventing the chuck from passing through the aperture into the housing. Resilient means within the housing are provided for exerting a force on the hose to pull the hose into the housing to eliminate the presence of loose air lines in the vicinity of the tire changer.

According to a preferred embodiment, the resilient means comprise a spring-biased, pivotal arm which engages the hose within the housing. Preferably, the arm has a bifurcated end and an opposite end pivotally connected to the base. A spring is connected to the arm intermediate its ends and to the base for biasing the bifurcated end away from the aperture. A pin, preferably a roller, extends across the bifurcated end and the hose is slidably confined within the bifurcated end by the pin.

In a highly preferred embodiment, an additional roller is journalled by the bifurcated end and the hose passes between the two rollers.

Other objects and advantages will become apparent from the following specification taken in connection with the accompanying drawings.

DESCRIPTION OF THE DRAWINGS

FIG. 4 is a fragmentary view similar to FIG. 1 illustrating an air hose retraction system made according to the invention.

DESCRIPTION OF THE PREFERRED EMBODIMENT

Figure 1:
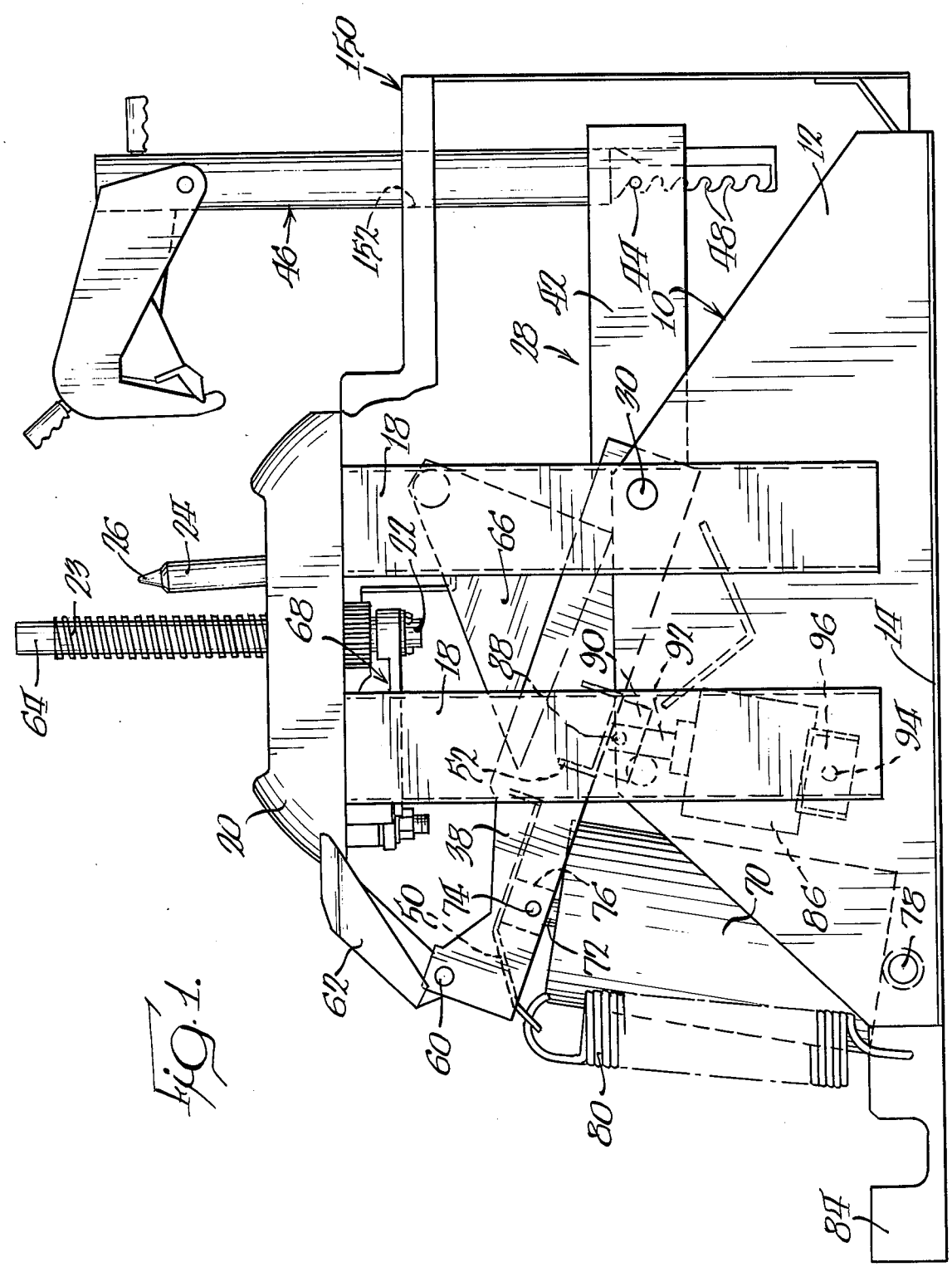
FIG. 1 is a partial side elevation of a tire changing apparatus made according to the invention with parts of the housing removed for clarity.
Figure 2:
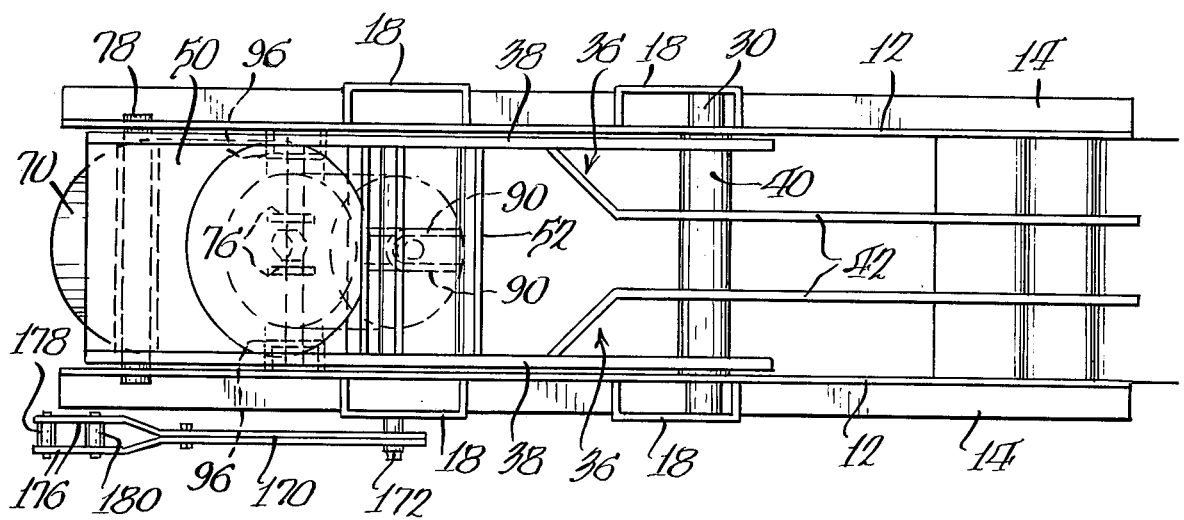
FIG. 2 is a horizontal section, looking downwardly, of parts of the bead loosening linkage and power source used in the tire changer.

An exemplary embodiment of a tire changing apparatus made according to the invention is illustrated in the drawings and, with reference especially to FIGS. 1 and 2, is seen to include a base, generally designated 10. The base 10 is formed of two, generally parallel, spaced apart, trapezoidal-shaped plates 12 which terminate at their lower edges in oppositely directed, horizontal flanges 14. Extending upwardly from the base 10 is a frame structure, generally designated 16, formed of four spaced, vertically extending legs 18 formed of channel or the like.

The frame structure 16, at its upper end, supports a generally frusto-conical, wheel-receiving table 20. Journalled in the center of the table top 20 and extending upwardly therefrom, is a rotatable center post 22 disposed within a threaded sleeve 23. A spring-biased plunger 24 projects upwardly from the table top 20 and has a tapered nose 26 adapted to be received in a lug hole in a wheel to prevent the wheel from rotating on the table 20 in a conventional fashion.

A rocker arm, generally designated 28, is mounted on the base 10, between the legs 18 on opposite plates 12 for pivotal movement about a generally horizontal axis defined by a pivot pin 30. As best seen in FIG. 2, the rocker arm 28 is defined by two, generally parallel, spaced rails, each generally designated 36. Each rail 36 is formed of a plate 38 mounting a sleeve 40 at one end thereof for receipt of the pin 30 and inner plates 42 which are spaced apart a distance less than the plates 38 and which are secured thereto as well as to the sleeve 40.

As best seen in FIG. 1, the right-hand ends of the inner plates 42 mount a cross pin 44 for association with an upper bead loosener assembly, generally designated 46, of conventional construction. As is well known, the bead loosener 46 may be secured to the rocker arm 36 in any of a variety of positions by selective disposition of the pin 44 in any of a plurality of slots 48 to compensate for tires of differing widths. It is also to be observed that the right-hand end of the rocker arm 28, as viewed in FIG. 1, extends past the right-hand side of the table 20.

The left-hand end of the rocker arm 28, as viewed in FIG. 1, extends past the left-hand side of the table 20 and the plates 38 are interconnected by a web 50. Intermediate the web 50 and the sleeve 40, an upwardly opening channel 52 also interconnects the plates 38.

As best seen in FIG. 1, a pin 60 pivotally mounts a lower bead loosener assembly 62 made according to the previously identified Stang et al patent and it will be observed that when the rocker arm 28 is pivoted in a clockwise direction on the pin 30, the lower bead loosener assembly 62 will be elevated toward the table 20 while the upper bead loosener assembly 46 will be lowered toward the table such that when a wheel with a tire is received on the table, the upper and lower beads thereof will be loosened at opposite sides of the tire.

The upper end of the center post 22 is designated 64 and is adapted for association with a tire changing tool in a conventional fashion for mounting or demounting a tire on a wheel received on the table 20. As mentioned earlier, the post 22 is rotatable so that a tool received on the end 64 will be rotated for the above-mentioned purpose. To this end, the rocker arm 28 includes an upward extension 66 which is connected to a linkage, generally designated 68, made according to the above-identified Stang et al patent whereby pivotal movement of the rocker arm 28 on the pin 30 will cause rotation of the center post 22 in a known fashion.

A reciprocal motor in the form of a single-acting, pneumatic cylinder 70 is provided for pivoting the rocker arm 28 in a clockwise direction about the pin 30. The rod 72 of the cylinder is connected by a pivot pin 74 to downwardly extending ears 76 (FIG. 2) on the underside of the web 50. The cylinder 70 is connected by a pivot pin 78 to the plates 12. To pivot the rocker arm 28 in a counterclockwise direction, as viewed in FIG. 1, to retract the bead looseners 46 and 62, a pair of return springs 80 (only one of which is shown) are connected to respective ears 82 on the left-hand end of the rocker arm 28 and to a base extension 84 configured in the form of an upwardly open channel and secured as by welding to the plates 12.

The cylinder 70 serves as the main power cylinder for operating the tire changer. To provide additional operating force for use in loosening beads and changing tires having stiff side walls and/or speed up the rate of operation of the apparatus, there is provided a booster cylinder 86. The booster cylinder 86 has a shorter stroke than that of the cylinder 70 and is connected to the rocker arm 28 by means of a pivot pin 88 extending through the downwardly projecting ears 90 on the underside of the channel 52 and through the rod 92 of the cylinder 86. The cylinder 86 is also pivoted by means of a pin 94 to inwardly directed channel brackets 96 interiorly of the plates 12.

Figure 3:
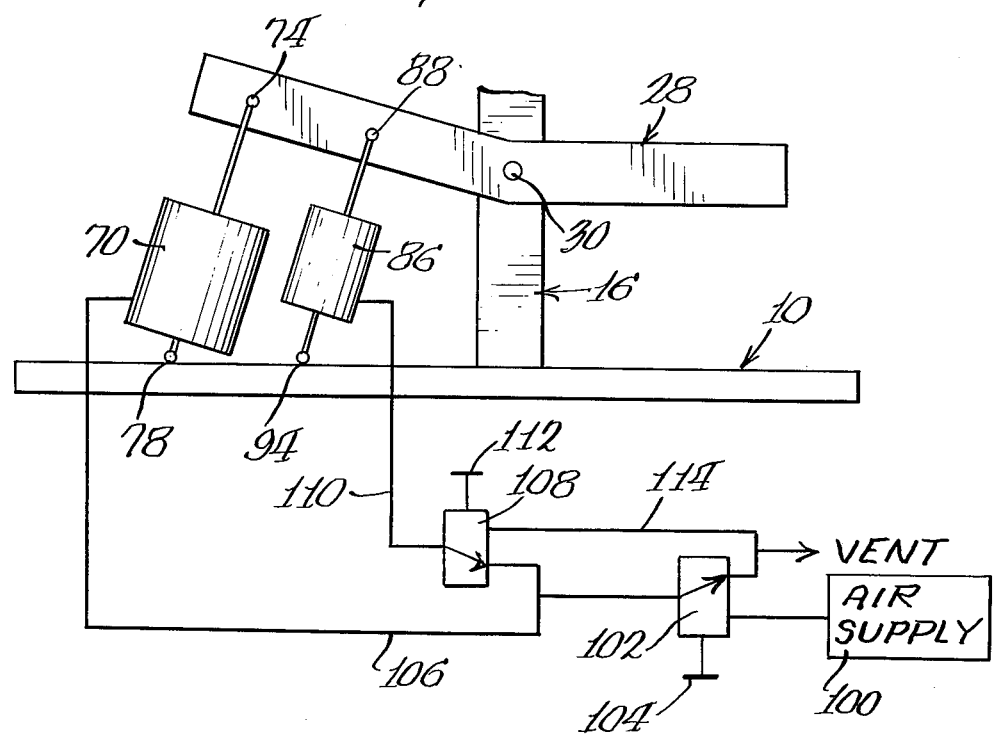
FIG. 3 is a schematic illustrating pressure fluid conduits and connections.

Turning now to FIG. 3, an air supply 100 such as a compressor, or the like, provides air to a valve 102 having a manual operator 104. The valve 102 has a vent port, as indicated, and a port connected to a conduit 106 which extends to the lower end of the cylinder 70. Typically, the operator 104 will be in the form of a foot pedal and the valve 102 will be spring-biased to the functional position illustrated in FIG. 3 so as to normally vent the cylinder 70 allowing the rocker arm 28 to be moved to its counterclockwisemost position under the influence of the springs 80. When the valve is shifted through the use of the operator 104, the air supply 100 will be connected to the conduit 106 to extend the cylinder 70 and pivot the rocker arm 28 in a clockwise direction.

The valve 102 is also connected to an inlet port on a valve 108, as indicated, and the same has an outlet port connected via a conduit 110 to the cylinder 86. The valve 108 has a manual actuator 112 as well as an outlet port 114 connected to vent. When the valve 108 is in the configuration illustrated in FIG. 3, operation of the valve 102 will result in air under pressure being supplied to the cylinder 86 to extend the same and it will act in concert with the cylinder 70 in pivoting the arm 28 in a clockwise direction. When the valve 104 is released, the cylinder 86 will be vented as will the cylinder 70.

As a result, for a given air pressure at the supply 100, an increased rotating force will be applied to the lever 28 through the use of the two cylinders 70 and 86 so that more power is available for loosening beads and changing tires having stiff sidewalls and/or speeding up the rate of operation of the changer. Similarly, if the air supply 100 is at a relatively low pressure, through the use of the two cylinders 70 and 86, reliable and adequate operation can nonetheless be obtained.

In some instances, as when changing tires on decorative rims where special care must be taken to avoid rough handling of the wheels which would mar their appearance, slow operation of the apparatus may be desired. In such a case, through use of the manual actuator 112, the valve 108 will be shifted from the position shown to connect the cylinder 86 to vent through the port 114. As a result, the cylinder 86 will be functionally, effectively uncoupled from the rocker arm 28 and the rotative force applied thereto will be solely through operation of the cylinder 70.

The apparatus includes a housing, generally designated 150, which is designed to contain the cylinders 70 and 86, and the rocker are 28 as well as the linkage 68. A guide opening 152 is provided in the upper surface of the housing 150 for guiding the upper bead loosener 46.

Referring now to FIG. 4, the left-hand end 154 of the housing 150 houses a surge tank 156 which receives air under pressure from the supply 100 for use with tire bead seating apparatus (not shown) associated with the tire changing apparatus in a known manner. Air from the surge tank 156 will likewise be piped to the valve 102 and to a control valve (not shown) for controlling the flow of air from the tank 156 to an air chuck 158 located exteriorly of the housing 150.

The upper surface of the housing 150 includes an aperture 160 sized to allow a flexible air hose 162 to slidably pass therethrough. A bulbous formation 164 located on the end of the air hose 162 adjacent the air chuck 158 is utilized to prevent the air chuck 158 from being drawn through the aperture 160 into the housing.

A considerable length of the air hose 162 enters the housing through the aperture 160 and is secured thereto by means of a bracket 166. The hose 162 extends from the bracket to a bleed valve 168 of conventional structure and used for conventional purposes to bleed excess air out of a tire being inflated.

Within the housing 150 is an arm 170 having one end pivoted as at 172 to one of the legs 18 approximately mid-way of the height of the housing 150. A spring 174 is connected to the arm 170 intermediate its ends and to the leg 118 so as to bias the arm 170 towards the position illustrated in FIG. 4 and away from the aperture 160 in the housing 150.

As best seen in FIG. 2, the end of the arm 170 remote from the pivot 172 is bifurcated as at 176. The bifurcated end 176 is closed off by a pin 178 in the form of a roller journalled in the end. A second roller 180 is also journalled in the bifurcated end and the rollers 178 and 180 are spaced apart a distance sufficiently so as to allow the hose 162 to pass between the two in a slidable fashion. As seen in FIG. 4, the hose 164 extends under the roller 178 and between the rollers 178 and 180.

As a consequence of the foregoing construction, the air chuck 158 may be grasped when needed and secured to the valve stem on a wheel and the control valve therefor (not shown) operated to inflate the tire. In so moving the chuck 158, a portion of the hose 162 will be withdrawn from the interior of the housing pivoting the arm 170 against the bias of the spring 174 in a clockwise direction. As soon as the inflation process is completed, the operator may release the chuck 158 from the valve stem whereupon the spring bias applied to the arm 170 will cause the same to move to the position illustrated in FIG. 4 and withdraw the hose 162 into the housing 150 so that it will be out of the way of the operator of the tire changing apparatus and cannot interfere with other operations.

From the foregoing, it will be appreciated that a tire changer made according to the invention is ideally suited for use in loosening beads and changing tires having stiff sidewalls and/or in service centers having widely fluctuating air pressure available, small installations having low air pressure available and/or will operate at a faster rate than tire changing apparatus heretofore known, thereby increasing the efficiency of the tire servicing operation.

We claim:

1. In a tire changing apparatus, the combination of:
   a base;
   an upwardly extending frame structure mounted on said base;
   a tire receiving table mounted on said frame structure;
   an elongated rocker arm pivoted at a pivot point intermediate its ends to said frame structure with its opposite ends extending to opposite sides of said table;
   upper and lower bead loosener assemblies associated with respective ends of said arm;
   a rotatable post mounted on said table top;
   means interconnecting said arm and said post for rotating said post in response to pivotal movement of said arm;
   a first cylinder connected between said arm and said apparatus in substantial alignment with one of said bead loosener assemblies for effectively directly operating said one bead loosener assembly and concurrently pivoting said arm in at least one direction; and
   a second cylinder connected to said arm at a location spaced from the point of connection of said first cylinder to said arm and to said apparatus for pivoting said arm in at least said one direction in concert with said first cylinder and with a force applied to said one bead loosener assembly less than the force developed by said second cylinder.

2. In a tire changing apparatus, the combination of:
   an elongated base;
   upwardly extending frame structures mounted on both sides of said base intermediate the ends thereof;
   a tire receiving table mounted on said frame structures;

an elongated rocker arm pivoted at a pivot point intermediate its ends to said frame structures with its opposite ends extending to opposite sides of said table and in the direction of elongation of said base;

upper and lower bead loosener assemblies associated with respective ends of said arm;

a rotatable post mounted on said table top;

means interconnecting said arm and said post for rotating said post in response to pivotal movement of said arm;

a first cylinder connected to said base and to one end of said arm in substantial alignment with one bead loosener assembly associated therewith for effectively directly operating said one bead loosener assembly and concurrently pivoting said arm in at least one direction; and a second cylinder of lesser stroke than said first cylinder connected to said arm between said first cylinder and said pivot point and to said base for pivoting said arm in at least said one direction with a force applied to said one bead loosener assembly less than the force developed by said second cylinder, said second cylinder being disposed between said frame structures.

3. In a tire changing apparatus, the combination of:

a base;

an upwardly extending frame structure mounted on said base;

a tire receiving table mounted on said frame structure;

an elongated rocker arm pivoted at a pivot point intermediate its ends to said frame structure with its opposite ends extending to opposite sides of said table;

upper and lower bead loosener assemblies associated with respective ends of said arm;

a rotatable post mounted on said table top;

means interconnecting said arm and said post for rotating said post in response to pivotal movement of said arm;

a first cylinder connected between one end of said arm and said apparatus for pivoting said arm in at least one direction and being disposed in substantial alignment with the associated bead loosener assembly for effectively directly operating said associated bead loosener assembly;

a second cylinder connected to said arm between said one end of the arm and said pivot point and to said apparatus for pivoting said arm in at least said one direction in concert with said first cylinder with a force applied to said one bead loosener assembly less than the force developed by said second cylinder;

pressure fluid supply conduit means connected to said cylinders and adapted to be connected to a source of pressure fluid; and valve means for interrupting the supply conduit means to said second cylinder independently of said first cylinder and for venting said second cylinder.

4. In a tire changing apparatus, the combination of:

a base;

an upwardly extending frame structure mounted on said base;

a tire receiving table mounted on said frame structure;

an elongated rocker arm pivoted at a pivot point intermediate its ends to said frame structure with its opposite ends extending to opposite sides of said table;

upper and lower bead loosener assemblies associated with respective ends of said arm;

a rotatable post mounted on said table top;

means interconnecting said arm and said post for rotating said post in response to pivotal movement of said arm;

a first cylinder connected to said base and to said arm in substantial alignment with one of said bead loosener assemblies for effectively directly operating said one bead loosener assembly and concurrently pivoting said arm in at least one direction;

a second cylinder of lesser stroke than said first cylinder connected to said arm between said first cylinder and said point intermediate said arm ends and to said base for pivoting said arm in at least said one direction with a force applied to said one bead loosener assembly less than the force developed by said second cylinder; and means for selectively, effectively uncoupling one of said cylinders from said arm.

5. The tire changing apparatus of claim 4 wherein said uncoupling means comprises a valve for blocking the flow of pressure fluid to said one of said cylinders and for simultaneously venting the same.

6. In a tire changing apparatus, the combination of:

a base;

an upwardly extending frame structure including spaced legs mounted on said base;

a tire receiving table mounted on said frame structure;

an elongated rocker arm comprising two spaced apart, generally parallel rails pivoted at pivot points intermediate their ends to said frame structure between the legs thereof and having opposed ends;

a web interconnecting said rails adjacent one end thereof;

a channel interconnecting said rails and located between said one end and said pivot points;

upper and lower bead loosener assemblies associated with respective ends of said arm;

a rotatable post mounted on said table top;

means inerconnecting said arm and said post for rotating said post in response to pivotal movement of said arm;

a first cylinder connected to said web and to said base in substantial alignment with one bead loosener assembly associated therewith for effectively directly operating said one bead loosener assembly and concurrently pivoting said arm in at least one direction; and a second cylinder connected to said channel and to said base for pivoting said arm in at least said one direction in concert with said first cylinder with a force applied to said one bead loosener assembly less than the force developed by said second cylinder, said second cylinder having a shorter stroke than said first cylinder.

7. The tire changing apparatus of claim 6 further including air conduits connected to said cylinders and adapted to be connected to a source of air under pressure; a control valve for directing air to both said cylinders; and an additional valve for selectively (a) allowing the flow of air from said control valve to one of said cylinders and (b) halting the flow of air to said one of said cylinders and simultaneously venting said one of said cylinders.

* * * * *